Aug. 16, 1949.    P. E. WALLACE    2,479,052
EDUCATIONAL CUTOUT DOLL DRESSING TOY
Filed May 5, 1947
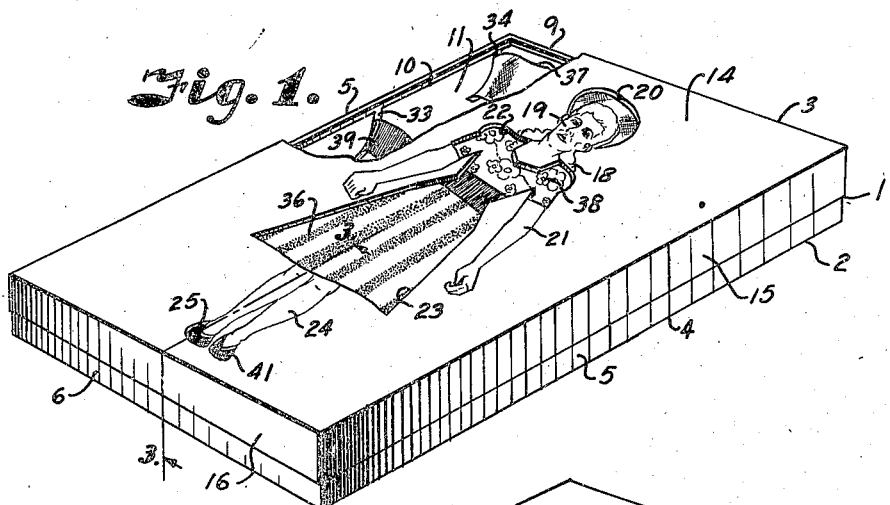
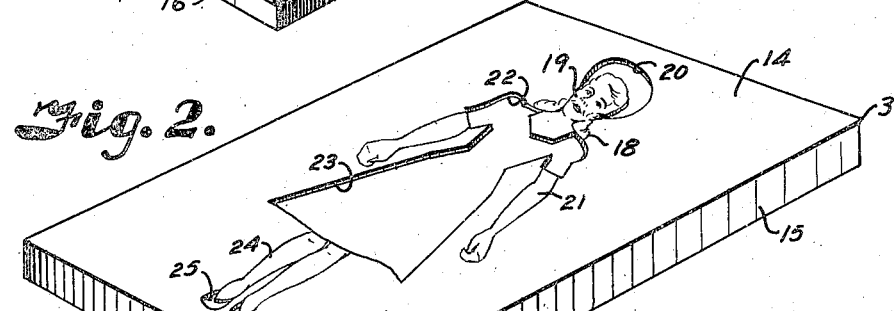
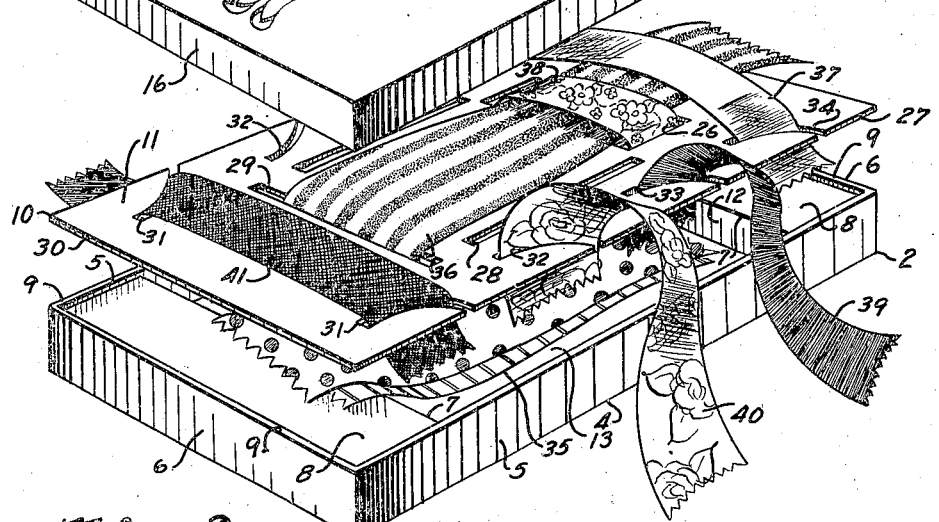
Inventor
Pauline E. Wallace
By Fishburn + Mullendore,
Attorneys Patented Aug. 16, 1949

2,479,052

UNITED STATES PATENT OFFICE 2,479,052

EDUCATIONAL CUTOUT DOLL DRESSING TOY

Pauline E. Wallace, Kansas City, Mo.

Application May 5, 1947, Serial No. 745,965

3 Claims. (Cl. 35—53)

This invention relates to an educational cutout doll dressing toy and more particularly to a device for amusement in arranging various combinations of material providing the appearance of a dressed cutout doll.

The objects of the present invention are to provide an educational device for teaching children color harmony while providing amusement in changing the dress of a cutout doll; to provide a cutout doll with devices for arranging various combinations of materials and garments for teaching a child the effect of said combinations of colors and patterns in the appearance of a clothed figure; to provide a cutout figure on a container enclosing strips of material of various colors and patterns and devices for selectively receiving said strips and supporting same adjacent the cutout figure to give the appearance of a dressed figure; to provide storage in the container for additional strips of material; to provide a plurality of strip-holding devices on a member adapted to underlie a cutout figure whereby strips of material may be selectively arranged forming different combinations of designs and patterns in the items of dress; to provide an amusement device using a plurality of strips of material in a container and adapted to be pulled over a dividing member in said container and underlie openings in the cover therefor for visual indication of various color schemes arranged thereby; and to provide a simple, compact arrangement whereby a child may gain amusement by selecting and arranging various colors to form a dressed doll and gain education as to color harmony.

In accomplishing these and other objects of the present invention, I have provided improved details of structure, the preferred form of which is illustrated in the accompanying drawings, wherein:

Fig. 1 is a perspective view illustrating a cutout doll on the cover of a container embodying the present invention, portions of the cover being broken away to illustrate the support for strips of material under the cutout.

Fig. 2 is a perspective view of the device, the parts being shown in disassembled spaced relation to better illustrate the arrangement of the various means for selectively arranging the strips of material therein.

Fig. 3 is a sectional view through the device on the line 3—3, Fig. 1.

Referring more in detail to the drawings:

1 designates a container adapted for amusement and education as to color harmony and preferably consists of a box 2 having a cover 3. The box 2 includes a bottom 4, side walls 5 and end walls 6. The box may be of any desired size but is preferably rectangular and relatively shallow. Located adjacent the end walls 6 are filler members 7 having a horizontal member 8 extending across the width of the box and spaced below the upper edge 9 of the walls 5 and 6 whereby a panel may be supported on the filler member and the upper face 11 thereof be below the edges 9 of said walls.

The horizontal members 8 are relatively short and their adjacent edges are provided with downturned flanges 12 forming a recess 13 centrally located in said box and confined by the bottom and side walls of the box and the flange 12 of the filler.

The cover 3 consists of the top 14 provided with depending side walls 15 and end walls 16, the top and side walls of said cover being so arranged that the cover fits over the box with the top engaging the edges 9 of the walls of the box and the walls 15 and 16 extend downwardly on the outside of the walls 5 and 6 of said box.

Printed or otherwise suitably applied to the top 14 is the representation of a figure 18. In the drawing the representation is the figure of a woman with the portions for the garments cut out, for example the picture of the head 19 is on the box and a portion of the top around the head is cut out as at 20 in any desired shape to simulate a hat on the figure's head. The figure includes pictures of arms 21, but the upper portion of said arms and the part forming the body of said figure is cut out as at 22 and 23 in the shape of a blouse and skirt. The legs are printed on the box, as at 24, and at the lower end thereof cutout portions 25 are provided of a shape to simulate shoes on the figure. It is obvious that any figure may be provided with suitable cutout portions for any item or shape of dress.

The panel 10 is a flat member slightly smaller than the interior dimensions between the walls 5 and 6, whereby said panel will fit in the box. Arranged in the panel adjacent the position of the cutout 22 in the top 14 are spaced slots 26, parallel with the side edges 27 of said panel and of slightly longer length than the blouse portion 22 of the cutout in the figure, the spacing between the slots 26 being greater than the width of the cutout portion 22. Slots 28 also parallel with the side edges 27 of the panel are provided therein adjacent the position of the cutout 23 and are of greater length than the cutout 23 of the figure, the spacing between the slots 28 being greater than the width of the skirt portion of the cutout figure. A slot 29 preferably parallel with the end edges 30 of the panel 10, and of greater length than the width of the skirt portion 23 of the cutout in the figure, is arranged in the panel whereby when said panel is placed under the cutout the slot will be spaced toward the edge 30 relatively to the cutout 23 of said figure. Pairs of arcuate slots 31, 32, 33 and 34 are spaced along and adjacent the side edges 27 of the panel, said slots being open at the side edges of said panel.

The various arrangement of the slots in the panel 10 provides for supporting strips 35 of material on said panel whereby the strips may be viewed through the various portions of the cutout figure on the top of the container. For example, in providing different combinations of dress for the figure, a strip of material 36 may be arranged on the panel 10 with the ends under the ends 30 of said panel whereby all of the garments of the figure appear to be made of the material or the strip may be inserted in the slot 29 and the end of said strip drawn over the upper face 11 of the panel between the slots 26 and 28. The panel may then be inserted in the box 2 to rest on the filler 7 and the cover 3 applied whereby the strip of material will be visible through the cutout portions 20, 22 and 23 and the figure will have the appearance of a dress and hat of the same material.

To provide a hat of different color or pattern, a strip 37 of material may be inserted in the slots 34 and drawn downwardly on the face 11 of the panel over the strip 36 and when the cover is applied over said panel the hat in the cutout figure will be formed by the strip 37. A blouse of different material may be provided by inserting the ends of a strip 38 in the slots 26 and drawing said strip downwardly over the top of the strip 36, and as shown in Fig. 1 the blouse of the dress will be the material of the strip 38. A contrasting belt may be applied to the figure by inserting the ends of a strip 39 of material in the arcuate slots 33 and drawing said strip adjacent the edge of the strip 38. Various widths of the strip 39 may be applied, or the strip may be folded as desired to provide belts of different widths. Also, the arcuate slots 33 permit various arrangements of the strip 39 to provide variations in the waistline of the cutout figure.

The skirt may be varied by inserting strips of material in the slots 28 and drawing said strip over the strip 36 and also by applying the ends of the strip 40 in the arcuate slots 32 whereby various stripes and combinations of material may be seen through the cutout portion 23 of the figure to give the effect of various combinations and stripes in the skirt portion thereof.

A strip 41 of material may be inserted in the arcuate slots 31 and drawn downwardly on the face 11 of the panel and when underlying the cover 3 will be visible through the cutout portion 25 to form the shoes of the figure.

A plurality of strips of various colors, patterns and types of material may be stored in the space 13 in the box for application to the panel 10 to provide other and various combinations of dress for the figure on the cover of the container. This arrangement of the slots in the panel 10 relative to the cutout portions in the top 3 provides various combinations of dress for the figure, provides for the arranging of various designs, colors, patterns and all types of cloth or other material and the various portions of the cutout figure whereby a child may arrange the dress as desired. For example, the width and the position of the belt may be changed, additional material may be applied to the skirt portion to give stripes thereto and by the use of different material different colored stripes may be applied as desired. Therefore a child will gain amusement from arranging the dress for the figure and also will be educated thereby as to color harmony and the blending of various patterns to make an attractive display and will also learn the different possibilities in regard to the appearance of clothes on a figure.

It is believed obvious that I have provided a simple, compact apparatus providing amusement and education in the dressing of a cutout doll.

What I claim and desire to secure by Letters Patent is:

1. In a device of the character described, a container consisting of a box and cover therefor, said cover having a picture of a person thereon and cutout openings in the normally clothed areas of said picture, a panel in said container having a plurality of spaced curved slots therein, said slots being open at the side edges of the panel, spaced means in the box supporting the panel adjacent the cover, and a plurality of strips of material adapted to be selectively applied to the slots and secured to the panel in overlying relation thereto whereby portions of said strips are visible through the cutout openings and represent clothing on the pictured person.

2. In a device of the character described, a container consisting of a box having end, side and bottom walls and cover therefor, a panel in said container having pairs of transversely aligned curved slots open at the side edges of said panel and spaced transverse and longitudinal slots between said aligned curved slots, inserts in the box adjacent the end walls thereof for supporting the panel adjacent the cover and forming a central space between the panel and bottom wall, a plurality of strips of material adapted to be selectively extended through the slots and arranged in overlying relation to the panel, the ends of the strips being in the central space of the box, and a representation of a figure upon the cover, the portions of the cover corresponding to the articles of clothing of the figure being cut out and located between the slots permitting a view of portions of the strips of material overlying the panel in combination with said figure representation whereby said strips appear to form the articles of clothing of the figure.

3. In a device of the character described, an opaque cover member, a representation of a figure on said cover member, said cover member having a plurality of openings corresponding in shape to articles of clothing of said figure, a panel under said cover member and having a plurality of spaced longitudinal and transverse slots arranged in said panel around the place corresponding to the cutout portions of the cover member, said panel having a plurality of spaced pairs of transversely aligned curved slots open at the side edges thereof, and a plurality of strips of material selectively arranged in the slots and visible through the openings in the cover member to provide the appearance of the articles of clothing of the figure on said cover member.

PAULINE E. WALLACE.

REFERENCES CITED

The following references are of record in the file of this patent:

UNITED STATES PATENTS

| Number | Name | Date |
| --- | --- | --- |
| 1,381,528 | White | June 14, 1921 |
| 2,035,532 | Cahn | Mar. 31, 1936 |
| 2,155,924 | Barrett et al. | Apr. 25, 1939 |
| 2,294,131 | Raymond | Aug. 25, 1942 |